(12) United States Patent
Reinke et al.

(10) Patent No.: US 6,264,134 B1
(45) Date of Patent: Jul. 24, 2001

(54) APPARATUS AND METHOD FOR CENTERING A SPOOL OR SIMILAR OBJECT

(75) Inventors: Stephen M. Reinke, Rochester; Frank Castrignano, Fairport; William R. De Munck, Hilton, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/528,274

(22) Filed: Mar. 17, 2000

Related U.S. Application Data

(63) Continuation-in-part of application No. 08/824,112, filed on Mar. 25, 1997, now abandoned.

(51) Int. Cl.$^7$ .................................................. B65H 16/06
(52) U.S. Cl. .................................. 242/596.5; 242/596.7; 269/218; 269/270
(58) Field of Search ............................. 242/596.5, 596.6, 242/596.7, 546, 349, 348.1; 29/806; 269/218, 268, 269, 270

(56) References Cited

U.S. PATENT DOCUMENTS

| | | | |
|---|---|---|---|
| 2,662,698 | * 12/1953 | Littell | 242/596.6 |
| 5,535,955 | * 7/1996 | Enger et al. | 242/596.6 |

* cited by examiner

*Primary Examiner*—John Q. Nguyen
(74) *Attorney, Agent, or Firm*—Clyde E. Bailey, Sr.

(57) ABSTRACT

An apparatus and method for centering a film spool or similar object. A quill or object support means arranged on either inboard and outboard ends a frame are used to engage end portions or flanges of the film spool. A pivot member provides translational simultaneous movement of both quills toward and away from the spool. The quills move equidistant relative to the centerline of the spool so that the centerline of an incoming web to be wound thereon will always align with the centerline of the spool.

4 Claims, 5 Drawing Sheets

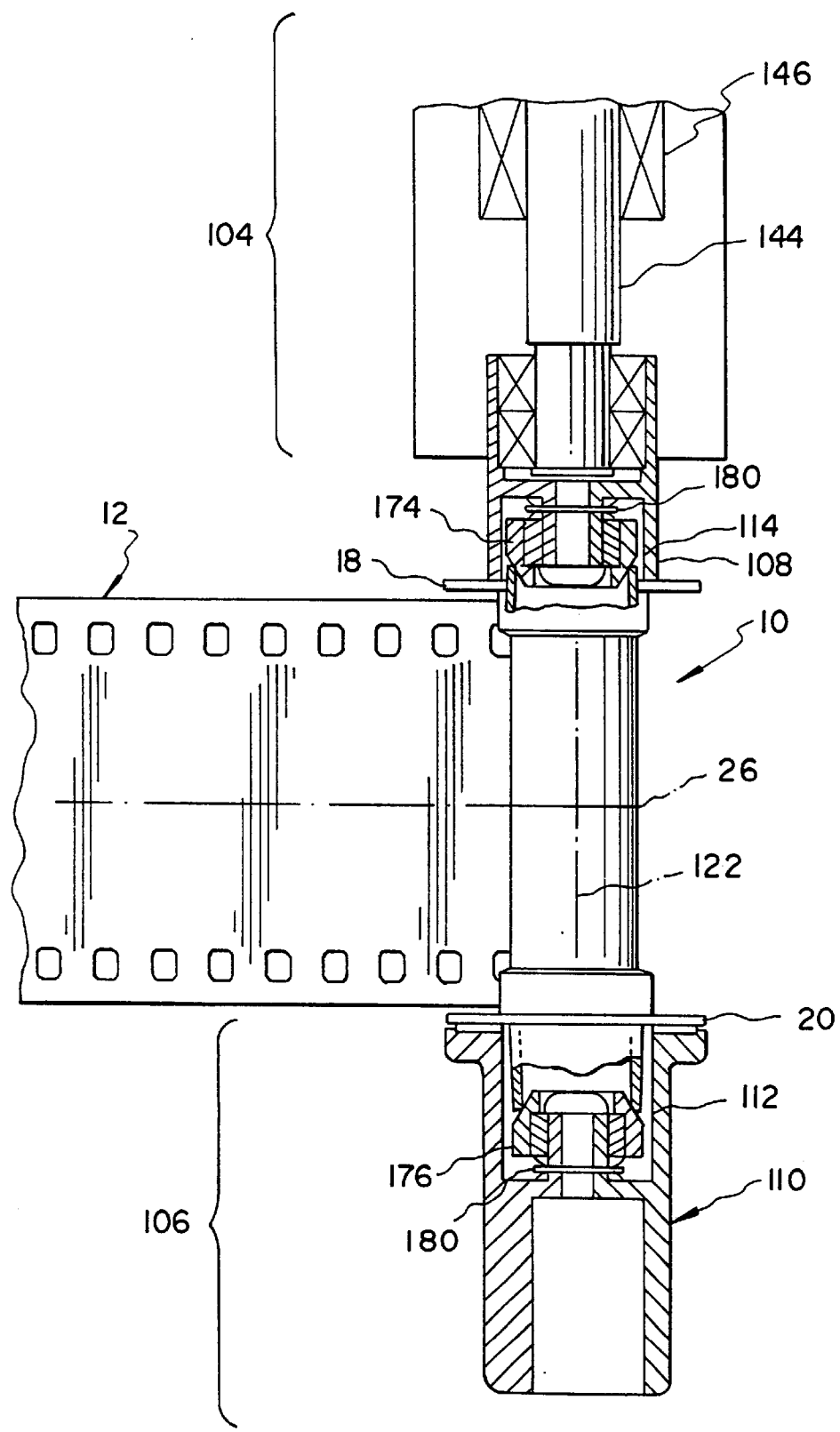

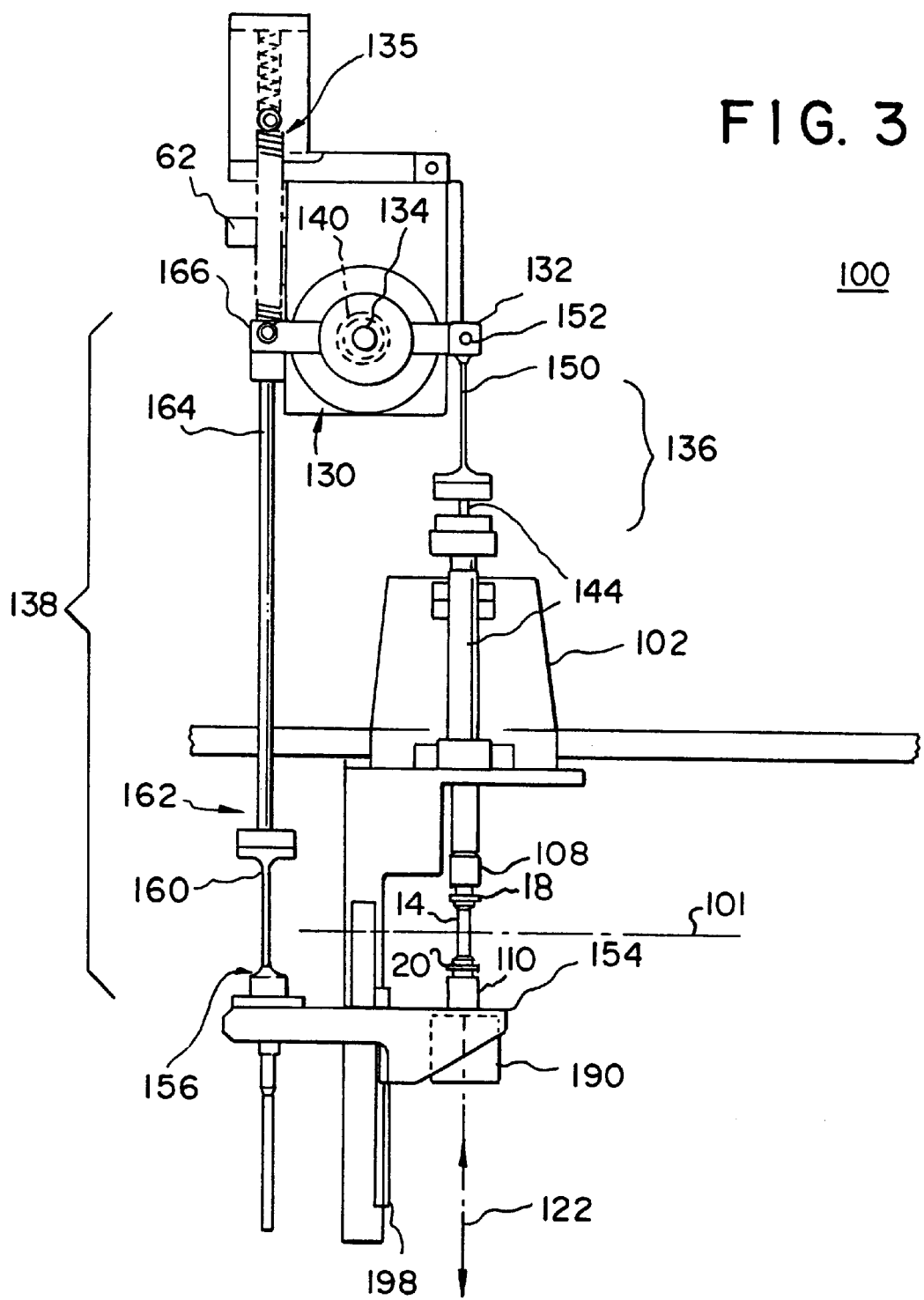

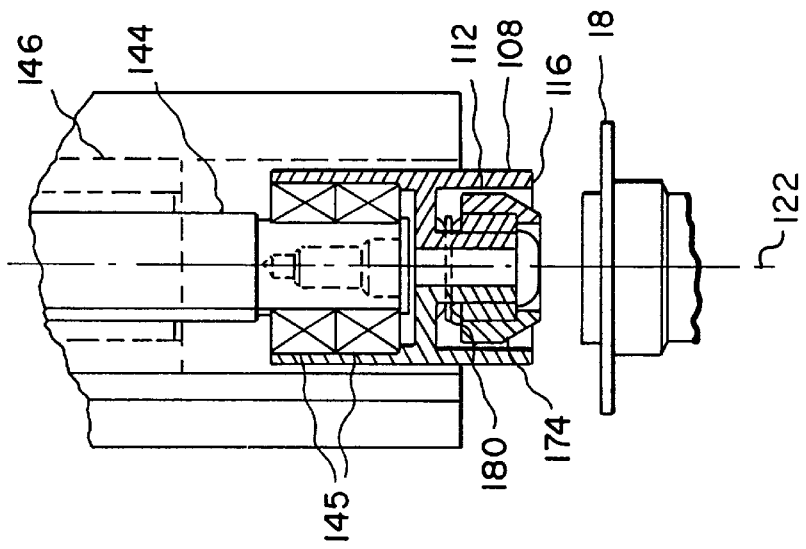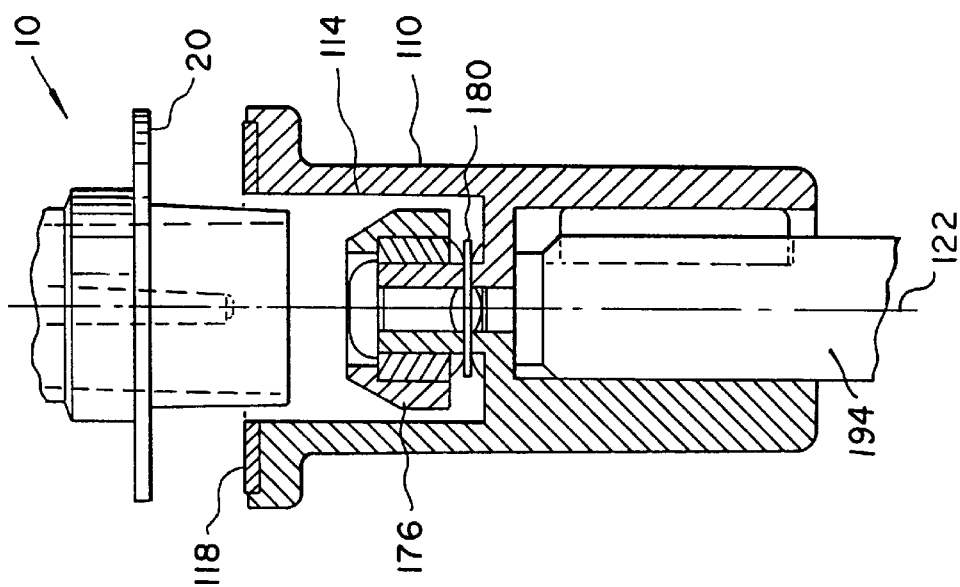

APPARATUS AND METHOD FOR CENTERING A SPOOL OR SIMILAR OBJECT

CROSS-REFERENCE TO RELATED APPLICATIONS

This is a continuation-in-part of application Ser. No. 08/824,112, filed Sep. 25, 1999 (per Palm System), entitled "APPARATUS AND METHOD FOR CENTERING A SPOOL OR SIMILAR OBJECT" by Stephen M. Reinke, et al., abandoned.

FIELD OF THE INVENTION

The invention relates generally to an apparatus and method for centering a spool or similar object. More particularly, the invention concerns an apparatus for centering a film spool or similar object for receiving an incoming web that minimizes film spool to web misalignment that generally occurs during spooling.

BACKGROUND OF THE INVENTION

A considerable variety of methods and apparatus have been developed over the years for winding and packaging strips of web material. For instance, U.S. Pat. No. 2,940,232 discloses such an apparatus for use with photographic film in which strips of web are wound onto photographic spools. Typically, such apparatus locates cooperating spool quills either from the inboard or the outboard flange on the spool from the corresponding film edge. The accumulation of the tolerances is from one end which can result in a misalignment of the film centerline and the spool centerline. This misalignment causes all the tolerances to add up on one side only.

While progress has been made in reducing the misalignment between the spool and web during spooling, there is clearly a need for continuous improvement as production speeds continue to escalate. For instance, U.S. Pat. No. 5,105,535 discloses a centering mechanism for a film spool wherein the spool engaging members are accurately moved toward or away from one another by a single crank member. This mechanism uses a crank drive to move the quill to a fixed position, but one quill is driven to the fixed location and the other quill is spring loaded to account for the variability in spool size.

In U.S. Pat. No. 4,105,172 provides for a centering mechanism wherein opposite mandrels are equally positioned toward one another by a hydraulically actuated toggle means. The two piece mandrels come to the same position each time because the mandrels are of a fixed length. In short the mandrels in this device stop on each other. Furthermore, this patent is not concerned with size differences of the spool. The toggle described in this patent is used to engage the mandrels only.

Further, U.S. Pat. No. 5,060,878 discloses a centering means wherein a motor drives a single spindle for moving a pair of roll engaging arms toward or away from one another. This device will chuck up a roll of any size, but it has a cylinder to move the whole assembly to position the edge of the roll relative to the machine. Thus, its purpose is not to maintain a constant centerline regardless of variations in tolerances of the film spool.

Moreover, U.S. Pat. No. 4,676,449 discloses a centering mechanism wherein a pair of proximity switches are used to determine inaccurate positioning of a pair of loom holders and thereafter adjusts one or both for proper centering. This reference teaches the use of sensors to measure the spool flanges and inputs the signals from the sensors to a controller that drives the spool flanges on center.

While automatic packaging apparatus and methods of the types just discussed have achieved a measure of acceptance and success over the years, a need has continued to persist for an apparatus and method for centering an object, such as a film spool, for receiving an incoming web to reduce the misalignment between the web and the spool and thereby reduce web shrinkage. Particularly when using spools having various core lengths, centering the spool with the incoming web to prevent misalignment provides an opportunity to achieve further needed improvement and greater efficiency in the spooling process.

SUMMARY OF THE INVENTION

An object of the present invention is to provide an apparatus that can center a film spool or similar object especially for receiving an incoming web.

Another object of the invention is to provide an apparatus that minimizes film strip to film spool misalignment during spooling.

Still another object of the invention is to provide a method for centering a film spool or similar object to minimize spool to web misalignment during spooling.

Yet another object of the invention is to provide an apparatus that will repeatedly center a film spool regardless of variations in the core lengths.

It is a feature of the invention that a pair of aligned object support means move toward and away from each other by a drive means for supporting either end portion of the film spool or object such that the central portion of the film spool or object is equidistant from stop members in the object support members.

To accomplish these and other objects of the invention, there is provided, an apparatus for centering objects, such objects having an elongated core of various lengths, a first end portion, a second end portion opposite said first end portion, and a central portion midway between the first and second end portions. According to the invention, the apparatus has a frame having an inboard end and an outboard end opposite said inboard end. First and second object support means are arranged in alignment with one another on the frame. First object support means is arranged on the inboard end for Supporting the first end portion of the object and the second object support means is arranged on the outboard end for supporting the second end portion of the object. Each of the first and second object support means has a first and second fixed stop member, respectively, arranged for restricting axial movement of a respective end portion of the object supported therein. Means associated with the first and second object support means is provided for enabling translational movement of the first and second object support means toward and away from one another. Translational movement of the first and second object support means towards each other causes the object to be alignably supported with its central portion equidistant from the first and second fixed stop members of the first and second object support means, respectively.

In another aspect of the invention, a method is provided for centering objects for receiving a web, such objects having an elongated core of various lengths, a first end portion, a second end portion opposite the first end portion, and a central portion midway between the first and second end portions. Included is the step of providing a pair of opposing object support members for supporting an end portion of the object. The object support members have shoulder portions for restricting axial movement of either of the end portions. Also provided is a step of providing means for enabling translational movement of the opposing object support members toward and away from each other. It is important that the object support members are aligned with one another during this process. Further, the step of moving the opposing object support members toward one another is provided for supporting the end portions of the object. Still further, the object is supported by the object support members such that the object is positioned with its central portion midway between the shoulder portion. As a result, the object is centered for receiving an incoming web.

Accordingly, it is an important advantageous effect of the present invention that the film spool or similar object supported by the object support means or quills will always be centered with the incoming web or film strip to be wound about the spool regardless of dimension of the elongated core. Further, it is another advantage of the present invention that bias centering hubs arranged in the quills locate the center of rotation of the spool on an axis passing through the aligned object support means. Yet another important advantage of the present invention is that if a film spool is improperly positioned between the quills during the engagement of the quills about the film spool, a spring biasing the spool will prevent an overload condition of the first drive means.

BRIEF DESCRIPTION OF THE DRAWINGS

The foregoing as well as other objects, features and advantages of the invention will become more apparent from the appended Figures, wherein like reference numerals denote like elements, and wherein:

FIG. 2 is a top plan view of the apparatus according to the principles of the invention partially sectioned to show containing the film spool;

FIG. 3 is a front plan view of the apparatus of the invention illustrating the translational movement of the object support members;

FIG. 5 is a cross sectional view of the outboard quill engaging one end of the film spool;

FIG. 6 is a cross sectional view of the inboard quill engaging the opposite end of the film spool;

DETAILED DESCRIPTION OF THE PREFERRED EMBODIMENTS

Figure 1:
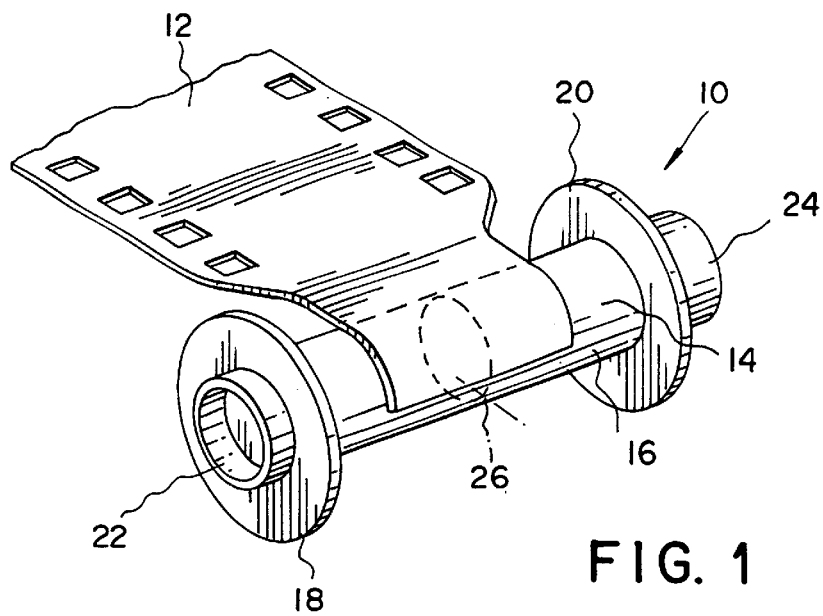
FIG. 1 is a perspective view of a prior art film spool for centering by the apparatus of the invention.

The following is a detailed description of the preferred embodiments of the invention, reference being made to the drawings in which the same reference numerals identifying the same elements of structure in each of the several Figures.

FIG. 1 illustrates a known film spool 10 used for winding a strip of photographic film 12, such as 35 mm film, or other web material thereon. Generally, spool 10 has an elongated core 14 having a generally cylindrical outer surface 16 on which the film strip 12 is wound. The elongated core 14 can have various lengths, more typically attributed to variations in manufacturing tolerances. Spool 10 includes a pair of first and second end portions hereinafter end flanges 18, 20, mounted on the core 14 from which extend hollow axial hubs 22, 24. A central portion 26 of the spool 10 along core 14 is defined midway between the first and second end flanges, 18, 20.

Figure 4:
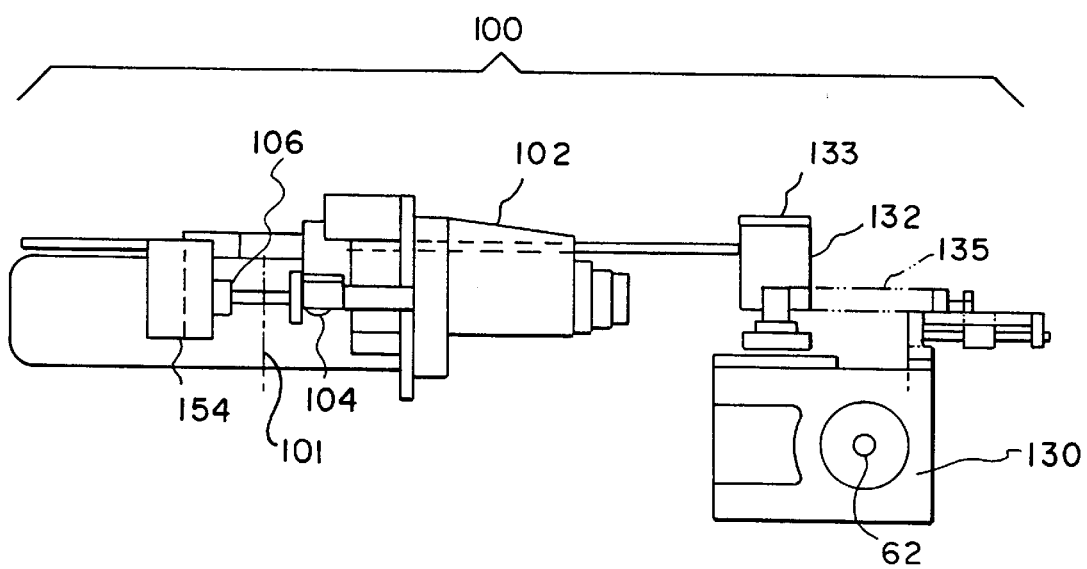
FIG. 4 is a side elevational view of the apparatus of the invention.

Referring now to FIGS. 2–4, the apparatus 100 for centering a film spool 10 or similar object, is illustrated. Broadly defined, apparatus 100 comprises preferably a rigid frame 102 having an inboard end 104 and an outboard end 106 opposite the inboard end 104. As described in greater details below, a first object support means 108 is arranged on inboard end 104 of frame 102 for supporting the first end flange 18 of the film spool or object 10. Similarly, a second object support means 110 is arranged on the opposite or outboard end 106 for supporting the second end flange 20 of the film spool or object 10.

As illustrated in FIGS. 3 and 4, means 130, preferably an oscillator drive manufactured by Camco Company located in Wheeling, Ill., provides translational movement of the first and second object support means, hereinafter referred to as inboard and outboard quills 108, 110. Moreover, inboard and outboard quills 108, 110 (clearly illustrated in FIG. 2) are aligned with each other and are arranged about frame 102 at a fixed distance from reference line 101 for movement toward and away from one another along axis 122. Reference line 101 passes through frame 102 midway through inboard quill 108 and outboard quill 110. On the one hand, translational movement of the inboard and outboard quills 108, 110 towards each other causes the film spool 10 to be alignably supported with its central portion 26 equidistant from the first and second fixed shoulder portions 116, 118 (shown in FIGS. 5 and 6) of the inboard and outboard quills 108, 110 respectively. On the other hand, translational movement of inboard and outboard quills 108, 110 away from one another along axis 122, releases the film spool or object 10 for transfer downstream for independent treatment.

Referring further to FIGS. 3, 4 and 7a and 7b, in a preferred embodiment of the invention, first and second quills 108, 110 are moved translationally by a first drive means 130 and a pivot arm 132. Pivot arm 132 is operably connected to the first drive means 130 via output shaft 134. Output shaft 134 is rigidly connected to first drive means 130. An input shaft 62 is operably connected to the first drive means 130. Input shaft 62 is driven continuously by means not shown and provides input to first drive means 130. Connecting elements 136, 138 are connected to first and second quills 108, 110, respectively. Connecting element 136 includes a first flexure 150 which is pivotably connected to pivot arm 132 via bearing 152 and rigidly connected to first connecting shaft 144. Connecting element 138 includes second connecting shaft 164 pivotably connected on one end to pivot arm 132 via bearing 166. On the opposite end, second connecting shaft 164 is rigidly connected to one end of second flexure 160. The other end of second flexure 160 is rigidly attached to motor bracket 154. Moreover, pivot arm 132 freely rotates about needle bearings 140 connected to output shaft 134 of first drive means 130. Shown in FIG. 4, and partially shown in FIGS. 7a and 7b, pivot arm 132 is biased against a stopped member 133 via extension spring 135.

Referring to FIG. 5, the friction of second fixed shoulder portion 118 of outboard quill 110 and the end flange 20 of film spool 10 provides the means by which second drive means 190 (as shown in FIG. 3) drives the film spool 10 to wind a scroll of film strip 12. We have found that it is beneficial to the invention to have a cast urethane or similar surface on the face of second fixed shoulder portion 118 of the outboard quill 110. Our experience indicates that the cast urethane surface increases the frictional coefficient between the flange 20 of film spool 10 and the drive face of second fixed shoulder portion 118 of outboard quill 110, thus eliminating any slippage.

Although quills 108, 110, are preferred, skilled artisans will appreciate that other configurations of object support means may be employed within the contemplation of the invention, such as, partially spherical, rounded, or various conical shapes. In FIG. 6, it can be seen that inboard quill 108 has a generally tubular shape with a first bore opening 112 for receiving and supporting the flange 18 of the film spool 10. Also seen in FIG. 6, inboard quill 108 is mounted on bearings 145 and serves as an idler while securing an end portion of the film spool 10. In FIG. 5, it can be seen that outboard quill 110, also tubular shaped, has a second bore opening 114 for receiving and supporting the flange 20 of the film spool 10. Each bore opening 112, 114 has a first and second fixed shoulder portion 116, 118, respectively, arranged thereon for restricting axial movement of a respective end flange 18, 20 of the film spool or object 10.

Figure 7B:
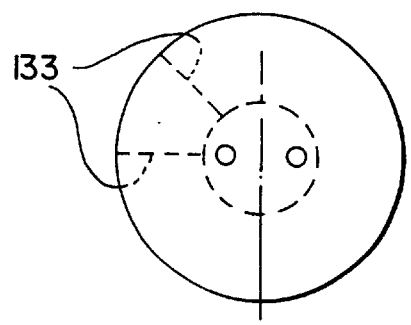
FIG. 7b is a partial top view of the first drive means.
Figure 7A:
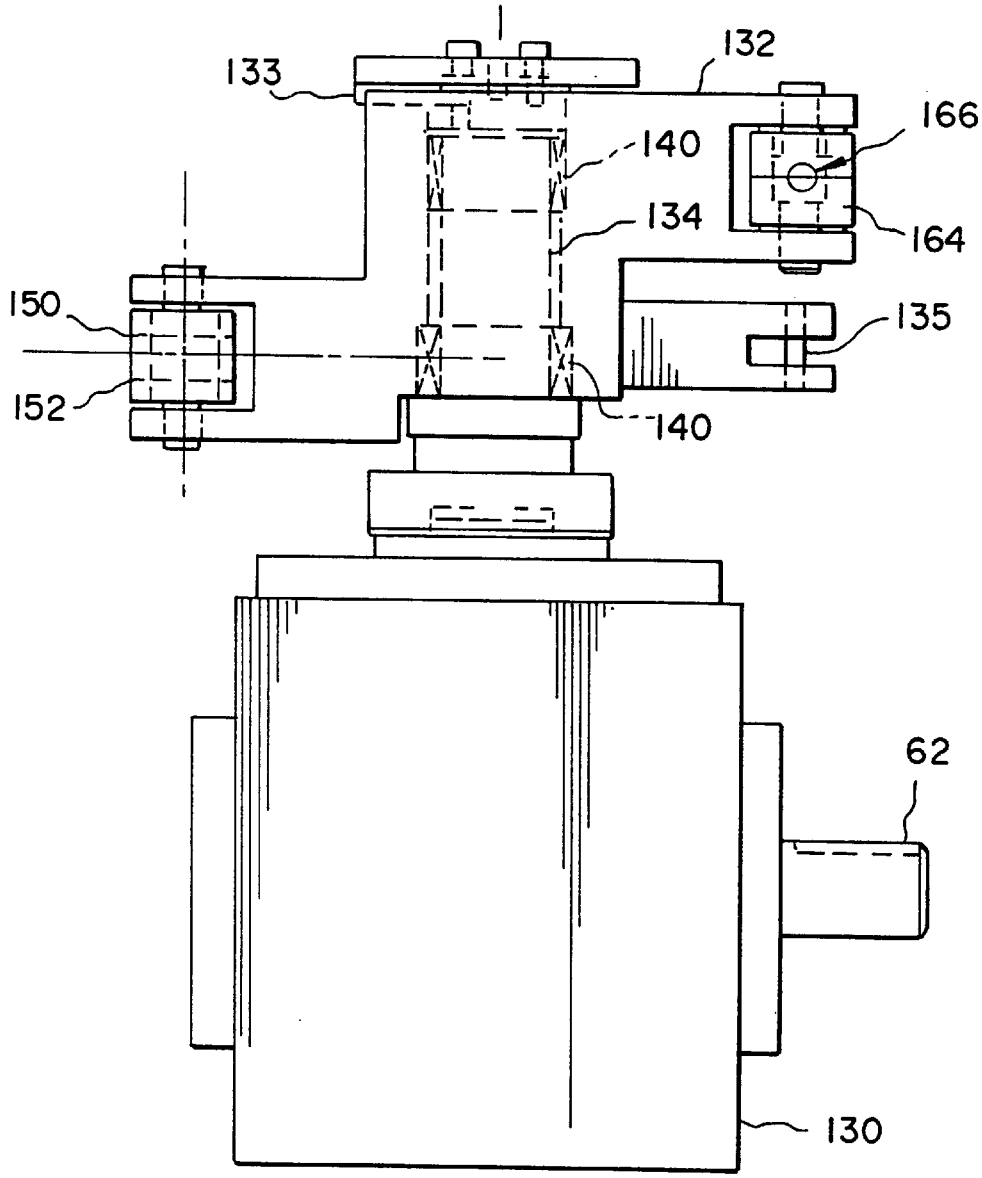
FIG. 7a is a side elevation view of the first drive means.

Referring again to FIG. 6, inboard quill 108 is rotatably mounted to one end of first connecting shaft 144 via bearings 145. FIGS. 2, 3, and 6 show first connecting shaft 144 which translates along axis 122 supported by linear bearings 146. Linear bearings 146 are arranged about frame 102. The other end of the first connecting shaft 144 is connected to a flexure 150 which is secured to the pivot arm 132 by bearing 152, as shown in FIGS. 3 and 7a.

Referring further to FIGS. 3 and 5, outboard quill 110 is mounted to second output shaft (not shown) of the second drive means 190, the second drive means is mounted to bracket 154. Bracket 154 is slidably mounted to frame 102 via linear bearing 198, such as a THK bearing. The motor bracket 154 is then connected at one end 156 to a flexure 160 with the other end 162 being connected to second connecting shaft 164. The opposite end of the tie shaft 164 is then connected to the pivot arm 132 by bearing 166 on a side opposite flexure 150, as discussed above.

Depicted in FIGS. 5 and 6, inboard and outboard quills 108, 110 each contains an identical spring biased centering hub 174, 176. Each hub 174, 176 is arranged in its respective bore opening 112, 114 of inboard and outboard quills 108, 110. Moreover, biased centering hubs 174, 176 engage a respective hollow axial hub 22, 24 of film spool 10 thereby securing them from lateral movement. Further, biased centering hubs 174, 176 are tapered so as to align the film spool 10 on the axis 122 of quills 108, 110 to minimize runout between the film spool 10 and the inboard and outboard quills 108, 110. At the same time, each of the centering hubs 174, 176 is allowed to translate along its axis 122 against identical spring washer 180, until the flanges 18, 20 of the film spool 10 come into contact with the first and second fixed shoulder portions 116, 118 of quills 106, 108, respectively.

Referring to FIGS. 3, 4, 7a, and 7b, first output shaft 134 has fixed rotational output angle, depending upon manufacturing requirements. For instance, when the output shaft 134 rotates through an angle of rotation of about 7 degrees, the inboard and outboard quills 108, 110 move translationally 0.400 inches (or 10.16 mm) toward or away from each other by the motion of pivot arm 132. In this example, the total 7 degree angular motion of output shaft 134 of the first drive means 130 moves quills 108, 110 translationally along fixed axis 122 0.400 inches (10.16 mm) toward or away from each other. In FIG. 3, the pivot arm 132 is shown at mid-stroke. In FIGS. 3, 4, 7a, and 7b, continuous rotation of input shaft 62 (described above) by drive means not shown causes output shaft 134 of first drive means 130 to oscillate by means of internal cam (not shown). In this case, the displacement (7 degrees) of output shaft 134 occurs during a 20 degree rotation of the input shaft 62. By rotating input shaft 62 up to about 48 degrees, the first output shaft 134 is in dwell where the output shaft pivot stop 133, has driven the pivot arm 132, to the fully retracted position (not shown). During this dwell period, the quills 108, 110 are retracted so the spool 10 and film scroll 12 can be laterally removed from the winding station by another mechanism (not shown). Then during another 20 degree rotation of input shaft 62, the first output shaft 134 moves to the engaged position of inboard end 104 and outboard end 106 which are shown engaged in FIG. 2. During this movement, the spring loads the pivot arm 132 against the pivot stop 133 that is connected to the output shaft 134. Both quills 108, 110, will contact its respective end flanges 18, 20 of the spool with slightly less than the 7 degree rotational motion of the first output shaft 134. When this occurs, the pivot stop 133 moves away from the pivot arm 132 and force from spring 135 attached to pivot arm 132 loads against the flanges 18, 20 by quills 108, 110. The inboard and outboard quills 108, 110 are engaged against the end flanges 18, 20 of film spool 10 for the remaining rotation of the input shaft 62 which is 272 degrees. During this time, film strip 12 is spooled onto the spool 10. Other drive means other than the oscillator with different displacements can be used depending on the required synchronized spooling time with other tooling at the winding station. For instance, a stepper motor, pneumatic actuator, server motor, or hydraulic mechanism are within the contemplation of the invention.

While the invention has been described with particular reference to a preferred embodiment, it will be understood by those skilled in the art the various changes can be made and equivalents may be substituted for elements of the preferred embodiment without departing from the scope of the invention. In addition, many modifications may be made to adapt a particular situation in material to a teaching of the invention without departing from the essential teachings of the present invention.

PARTS LIST 10 spool
12 strip of film
14 core
16 cylindrical outer surface
18 end flange
20 end flange
22 axial hub
24 axial hub
26 central portion
62 input shaft
100 apparatus
101 reference line
102 rigid frame
104 inboard end
106 outboard end
108 first object support means (inboard quills)
110 second object support means (outboard quills)
112 first bore opening 114 second bore opening
116 first fixed shoulder portion
118 second fixed shoulder portion
122 axis
130 drive means
132 pivot arm
133 stopped member
134 first output shaft
135 extension spring
136 connecting element
138 connecting element
140 needle bearing
144 first connecting shaft
145 bearing
146 linear bearing
150 first flexure
152 bearing
154 motor bracket
156 one end
160 second flexure
162 end
164 second connecting shaft
166 bearing
174 centering hub
176 centering hub
180 spring washer
190 second drive means
198 linear bearing

What is claimed is:

1. Apparatus for centering objects, such objects each having an elongated core of various lengths, said core having a first end portion, a second end portion opposite said first end portion, and a central portion midway between said first and second end portions, said apparatus comprising:

a frame having an inboard end and an outboard end opposite said inboard end;

first and second object support means comprising, respectively, a first freely rotating quill having a bore opening to receive the first end portion of said object, and a second driven quill having a bore opening to receive said second end portion of said object, wherein a biased centering hub is arranged in the bore opening of said first and second quills, said first object support means being axially arranged on said inboard end of said frame for supporting said first end portion of said object, and said second object support means being arranged on the outboard end of said frame for supporting said second end portion of said object; wherein each of said first and second object support means has a first and second shoulder portion, respectively, arranged for restricting axial movement of a respective end portion of the object supported therein; and wherein said first and second object support means are arranged equidistant about a fixed centerline passing between said first and second object support means and perpendicular to a first axis, said fixed centerline being positioned a fixed distance from said frame, and, means associated with said first and second object support means for providing translational movement of said first and second object support means toward and away from one another, said first and second object support means being axially aligned with one another along said first axis passing through said first and second object support means;

whereby translational movement of said first and second object support means towards each other causes said object to be alignably supported with said central portion of said object equidistant from said first and second shoulder portions of said first and second object support means, respectively thereby causing said central portion of said object to be coincident with said fixed centerline.

2. The apparatus recited in claim 1, wherein said means for providing translational movement comprises:

a first drive means having a first output shaft extending from said first drive means; and, a pivot arm having a first and a second connecting shafts connected to said first and second object support means, respectively, said pivot arm further being rotatably connected to said first output shaft of said first drive means and biased against said first output shaft.

3. The apparatus recited in claim 2, wherein a first stop member is arranged on said first drive means for restricting movement of said pivot arm.

4. The apparatus recited in claim 1, wherein said second driven quill is rotatably driven by a second drive means arranged in said frame.

* * * * *